US012307855B2

(12) United States Patent
Shepherd et al.

(10) Patent No.: US 12,307,855 B2
(45) **Date of Patent: *May 20, 2025**

(54) USER IDENTIFICATION VERIFICATION IN ASSOCIATION WITH TRANSFERRING FUNDS TO A GAMING TABLE

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,753

(22) Filed: Apr. 1, 2024

(65) Prior Publication Data

US 2024/0249592 A1 Jul. 25, 2024

Related U.S. Application Data

(63) Continuation of application No. 18/112,306, filed on Feb. 21, 2023, now Pat. No. 11,978,311, which is a continuation of application No. 17/220,591, filed on Apr. 1, 2021, now Pat. No. 11,600,140.

(51) Int. Cl.
*G07F 17/32* (2006.01)

(52) U.S. Cl.
CPC ...... *G07F 17/3241* (2013.01); *G07F 17/3227* (2013.01); *G07F 17/3239* (2013.01)

(58) Field of Classification Search
CPC ............. G07F 17/3241; G07F 17/3227; G07F 17/3239
See application file for complete search history.

(56) References Cited

U.S. PATENT DOCUMENTS

| | | | |
|---|---|---|---|
| 7,699,703 B2 | 4/2010 | Muir et al. | |
| 7,771,272 B2 | 8/2010 | Soltys et al. | |
| 8,087,983 B2 | 1/2012 | Longway | |
| 8,506,387 B2 | 8/2013 | Brosnan et al. | |
| 8,800,993 B2 | 8/2014 | Blaha et al. | |
| 8,876,608 B2 | 11/2014 | Shepherd et al. | |
| 9,411,944 B2 | 8/2016 | Alderucci et al. | |
| 9,495,829 B2 * | 11/2016 | Lutnick | G07F 17/3223 |
| 9,672,686 B2 | 6/2017 | Nguyen | |
| 9,811,973 B2 | 11/2017 | Nguyen | |
| 9,916,723 B2 | 3/2018 | Arnone et al. | |
| 9,916,735 B2 | 3/2018 | Chun | |
| 10,013,850 B2 | 7/2018 | Nelson et al. | |
| 10,553,073 B2 | 2/2020 | Williams et al. | |
| 10,558,978 B1 * | 2/2020 | Rayudu | G06Q 20/40145 |
| 10,706,667 B1 | 7/2020 | Shepherd et al. | |
| 10,741,020 B1 | 8/2020 | Thoeni et al. | |
| 2005/0288083 A1 | 12/2005 | Downs | |
| 2006/0040741 A1 | 2/2006 | Griswold et al. | |
| 2007/0060326 A1 | 3/2007 | Juds et al. | |
| 2007/0094721 A1 | 4/2007 | Nguyen et al. | |
| 2010/0211431 A1 | 8/2010 | Lutnick et al. | |
| 2015/0087377 A1 | 3/2015 | Yee et al. | |

(Continued)

*Primary Examiner* — Kevin Y Kim
(74) *Attorney, Agent, or Firm* — Neal, Gerber & Eisenberg, LLP

(57) ABSTRACT

Systems and methods that verify an identity of a user in association with a transfer of an amount of funds from a gaming establishment account associated with the user to a gaming table component associated with a gaming establishment gaming table.

19 Claims, 5 Drawing Sheets

(56) References Cited

U.S. PATENT DOCUMENTS

| | | | |
|---|---|---|---|
| 2015/0243133 | A1 | 8/2015 | Nicholas |
| 2016/0284166 | A1 | 9/2016 | Nelson et al. |
| 2017/0092037 | A1 | 3/2017 | Snow et al. |
| 2017/0092054 | A1 | 3/2017 | Petersen et al. |
| 2017/0148249 | A1 | 5/2017 | Richardson |
| 2018/0047249 | A1 | 2/2018 | Nelson et al. |
| 2018/0375845 | A1 | 12/2018 | Burns et al. |
| 2019/0096180 | A1 | 3/2019 | Petersen et al. |
| 2020/0126355 | A1 | 4/2020 | Yi et al. |
| 2021/0049865 | A1 | 2/2021 | Burns et al. |
| 2021/0275929 | A1* | 9/2021 | Warner ............... G07F 17/3227 |

* cited by examiner

300

USER IDENTIFICATION VERIFICATION IN ASSOCIATION WITH TRANSFERRING FUNDS TO A GAMING TABLE

PRIORITY CLAIM

This application is a continuation of, claims the benefit of and priority to U.S. patent application Ser. No. 18/112,306, filed on Feb. 21, 2023, which is a continuation of, claims the benefit of and priority to U.S. patent application Ser. No. 17/220,591, filed on Apr. 1, 2021, the entire contents of which are each incorporated by reference herein.

BACKGROUND

In various embodiments, the systems and methods of the present disclosure pertain to verifying an identify of a user in association with a transfer of an amount of funds from a gaming establishment account associated with the user to a gaming table component associated with a gaming establishment gaming table.

Gaming tables may enable one or more players to play one or more games wherein a player may be required to place a wager. A dealer may subsequently provide a player one or more playing cards. An award may be based on the player's playing cards and on the amount of the wager.

BRIEF SUMMARY

In certain embodiments, the present disclosure relates to a gaming table component including a processor, and a memory device that stores a plurality of instructions. When executed by the processor responsive to a transfer of an amount of funds from a gaming establishment account associated with a user, the instructions cause the processor to determine a verification identifier, communicate data that results in a mobile device associated with the user displaying the determined verification identifier, and communicate data that results in a display, by a display device, of a gaming chip purchase receipt associated with the determined verification identifier.

In certain embodiments, the present disclosure relates to a gaming table component including a processor, and a memory device that stores a plurality of instructions. When executed by the processor responsive to a transfer of an amount of funds from a gaming establishment account associated with a user, the instructions cause the processor to determine a verification identifier, communicate data that results in a mobile device associated with the user displaying the determined verification identifier, and communicate data that results in a printer printing a gaming chip purchase receipt associated with the amount of funds and comprising the determined verification identifier.

In certain embodiments, the present disclosure relates to a method of operating a gaming table component. Responsive to a transfer of an amount of funds from a gaming establishment account associated with a user, the method includes determining, by a processor, a verification identifier, communicating data that results in a mobile device associated with the user displaying the determined verification identifier, and displaying, by a display device, a gaming chip purchase receipt associated with the determined verification identifier.

Additional features are described, and will be apparent from the following Detailed Description and the figures.

DETAILED DESCRIPTION

Figure 1:
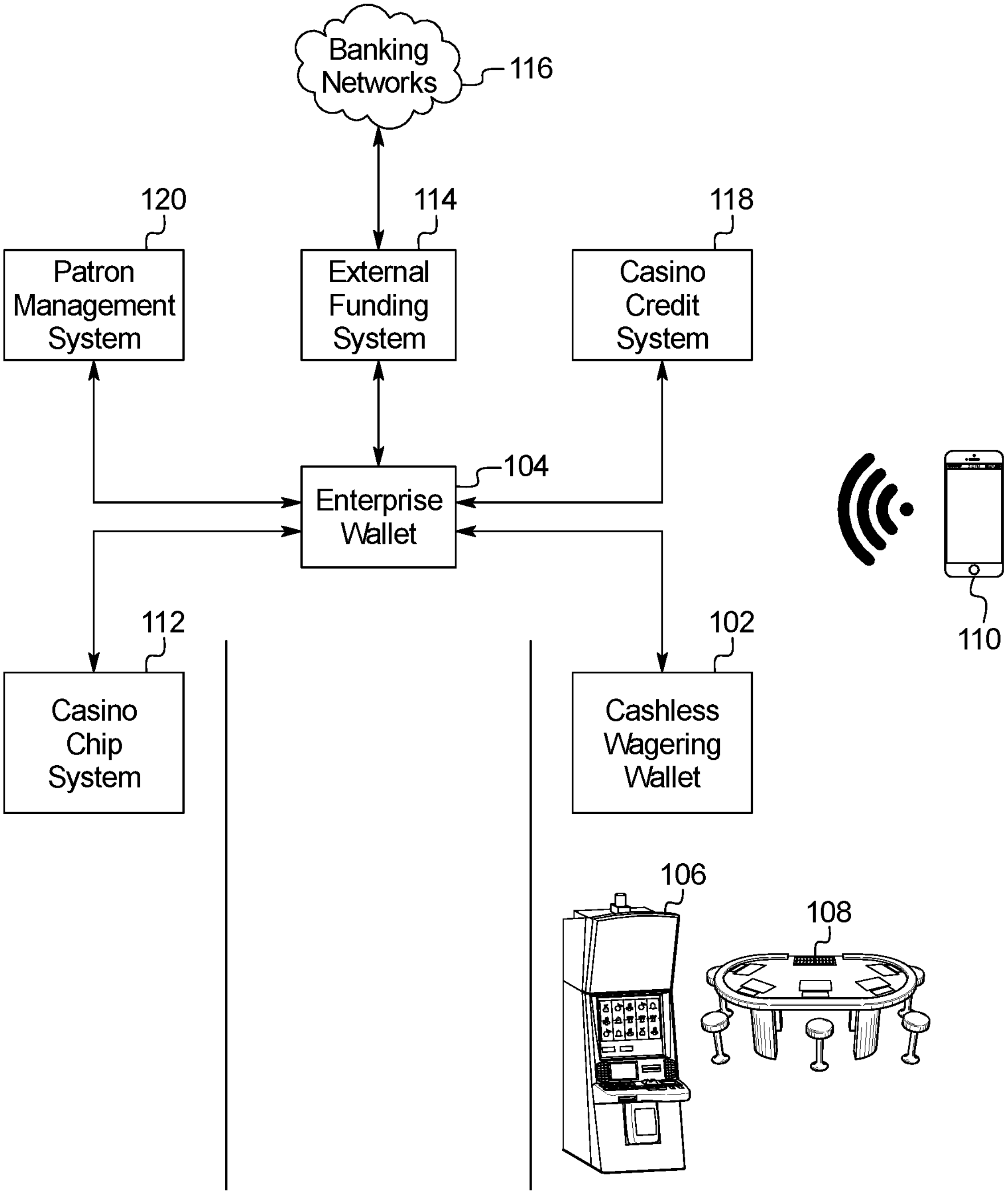
FIG. 1 is an example configuration of the architecture of a plurality of different components of the system of the present disclosure.

In various embodiments, the systems and methods of the present disclosure pertain to verifying an identity of a user in association with a transfer of an amount of funds from a gaming establishment account associated with the user to a gaming table component associated with a gaming establishment gaming table.

In certain embodiments, in view of the relatively limited avenues for a player to obtain gaming chips to be wagered at a gaming table, the system provides that the funds maintained in one or more gaming establishment accounts are transferred to a component associated with a gaming table and then exchanged for gaming chips to be played at the gaming table in association with a player identity verification event. That is, rather than a player having to bring an amount of cash to a gaming table (to be exchanged by a dealer for a corresponding amount of gaming chips), in certain embodiments, the system enables a player to transfer an amount of funds, such as via a mobile device application executed on the player's mobile device, from a gaming establishment account maintained for that player to a gaming table component, such as a dealer workstation at the gaming table or a fund transfer kiosk at the gaming table. In these embodiments, following the completion of the transfer of the amount of funds from the gaming establishment account maintained for that player to a gaming table component, to verify that the player whom should receive an amount of gaming chips corresponding to the transferred amount of funds is the same player that transferred the amount of funds, the system utilizes the employment of matching (or otherwise associated) verification identifiers provided to gaming establishment personnel and separately to the player. For example, to verify the correct player whom should receive an amount of gaming chips corresponding to the transferred amount of funds, the system causes a printer associated with the gaming table component to generate a receipt, such as a gaming chip purchase receipt, including a unique alphanumeric code (i.e., a verification identifier) for a dealer at the gaming table and also causes data associated with the unique alphanumeric code to be communicated to a mobile device of the player for presentation to the dealer of the gaming table (to verify via a confirmation that the two alphanumeric codes match). Following such a verification of an identity of the player whom initiated the transfer of the amount of funds, a gaming establishment personnel associated with the gaming table component, such as the dealer, issues an amount of gaming chips (corresponding to the transferred amount of funds) to the player to be wagered at the gaming table.

It should thus be appreciated that rather than requiring the gaming establishment personnel associated with the gaming table component to closely inspect both the instructions provided to the gaming establishment personnel identifying the player whom should receive the gaming chips and a form of identification presented by the player (which is very time consuming and may result in errors if multiple players are attempting to simultaneously transfers funds to the gaming table and the gaming establishment personnel inadvertently provides the wrong player the wrong amount of funds), the system of the present disclosure employs an alternative player identity verification that overcomes certain limitations encountered by gaming establishment personnel in distributing funds to players. Specifically, the player identity verification utilized by the system of the present disclosure not only saves gaming establishment personnel time (by alleviating the need to inspect at least a form of identification presented by the player), but reduces errors which often can occur when multiple players are attempting to avail themselves of electronically transfer funds to the gaming establishment component at the same time.

System Accounts

In various embodiments, the present disclosure is directed to a gaming establishment fund management system including various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (i.e., cashless wagering wallets) and/or gaming establishment retail accounts (i.e., gaming establishment retail wallets) associated with or otherwise maintained for a user, such as a player, collectively form an enterprise account (i.e., an integrated gaming establishment fund management wallet) that the user, such as a player, may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player, utilizes a mobile device application running on a mobile device and/or a physical instrument (e.g., a smart card or a user issued magnetic striped card which the user utilizes via inserting the card into a player tracking unit) to facilitate the electronic transfer of any funds between this first cashless wagering account and a gaming device, such as a component of a gaming table and/or an electronic gaming machine (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a cashless wagering wallet 102 (e.g., a first cashless wagering account) which is in communication with the enterprise wallet 104. In this illustrated example, to facilitate the transfer of funds from this cashless wagering account to a credit balance of an electronic gaming machine ("EGM") 106 and/or a credit balance of a gaming table component (not shown) associated with a gaming table 108, the system utilizes a mobile device 110 running a mobile device application that interfaces with one or more components of the gaming establishment fund management system to enable a user, such as a player at the gaming table, access to this first cashless wagering account.

In certain embodiments (not shown), the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table.

In various embodiments (not shown), in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, to facilitate the transfer of funds from a gaming establishment retail account to an account associated with a retailer to purchase goods and/or services from the retailer, the system utilizes a retail wallet identity, such as a mobile device running a mobile device application that interfaces with a point-of-sale terminal of a retail point-of-sale system of the retailer, and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer. It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account.

Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more gaming establishment chip management systems which each track gaming chips distributed into circulation (e.g., gaming chips provided by a dealer at a gaming table or gaming chips provided by gaming establishment personnel at a gaming establishment service desk) and gaming chips removed from circulation (e.g., gaming chips redeemed by a dealer in association with the closing of a gaming table or gaming chips provided to gaming establishment personnel at a gaming establishment service desk in exchange for cash). For example, as seen in FIG. 1, the gaming establishment fund management system that maintains the enterprise wallet 104 is in communication with a gaming establishment chip management system (i.e., the casino chip system 112) to facilitate the obtaining and/or disposal of zero, one or more gaming chips. In this illustrated example, to facilitate a transfer of funds between a cashless wagering account (or other account associated with or in communication with the gaming establishment fund management system) and the gaming establishment chip management system to procure an amount of gaming chips usable at a gaming table 108, the system utilizes a mobile device 110 running a mobile device application. It should be appreciated that while illustrated as the gaming establishment fund management system being in communication with one or more gaming establishment chip management systems, in different embodiments, any component or sub-system of the present disclosure can be in communication with one or more gaming establishment chip management systems.

In certain embodiments, the gaming establishment fund management system is in communication with one or more external funding sources which maintain one or more external accounts for the user. For example, as seen in FIG. 1, the gaming establishment fund management system that maintains the enterprise wallet 104 is in communication with an external funding system 114 which is in communication with a network of one or more banks or other financial institutions (i.e., the banking networks 116) which operate to electronically transfer funds from the user's accounts maintained at such banks or financial institutions to one or more of the accounts maintained by the gaming establishment fund management system and/or provide financial information associated with the user's accounts maintained at such banks or financial institutions. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). In this illustrated example, the system utilizes a mobile device 110 running a mobile device application to facilitate the transfer of funds from an external account and/or facilitate the transfer of financial information associated with such external accounts. It should be appreciated that while illustrated as the gaming establishment fund management system being in communication with one or more external funding sources, in different embodiments, any component or sub-system of the present disclosure can be in communication with one or more external funding sources.

In certain embodiments, the gaming establishment fund management system is in communication with one or more credit systems which each issue the user one or more lines of credit or markers. For example, as seen in FIG. 1, the gaming establishment fund management system that maintains the enterprise wallet 104 is in communication with a gaming establishment credit system (i.e., the casino credit system 118) to facilitate the establishment of an amount of funds in the gaming establishment fund management account via one or more lines of credits. In this illustrated example, to facilitate a transfer of funds from the line of credit issued by the credit system to a cashless wagering account (or other account associated with or in communication with the gaming establishment fund management system) and/or between the line of credit and the gaming establishment chip management system to procure an amount of gaming chips, the system utilizes a mobile device 110 running a mobile device application. It should be appreciated that while illustrated as the gaming establishment fund management system being in communication with one or more credit systems, in different embodiments, any component or sub-system of the present disclosure can be in communication with one or more credit systems.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments, the gaming establishment fund management system is in communication with one or more gaming establishment patron management systems. For example, as seen in FIG. 1, the gaming establishment fund management system (i.e., enterprise wallet 104) is in communication with one or more gaming establishment patron management systems (i.e., the patron management system 120) that assists in the creation of one or more accounts as well as monitor activities at various points of contact associated with a gaming establishment and provides rewards, such as redeemable player tracking points, in association with such activities. It should be appreciated that any component or sub-system of the present disclosure can be in communication with one or more gaming establishment patron management systems.

In certain embodiments, the system utilizes one mobile device application to interact with the different components of the gaming establishment fund management system to access funds maintained in the different gaming establishment accounts associated with the user, and/or engage in a transaction associated with an amount of gaming chips. For example, utilizing the same mobile application, a mobile device interacts with both the first cashless wagering system of the gaming establishment fund management system and the gaming establishment chip management system in communication with the gaming establishment fund management system. In certain embodiments, the system utilizes multiple mobile device applications to interact with the different components of the gaming establishment fund management system to access funds maintained in the different gaming establishment accounts associated with the user, and/or engage in a transaction associated with amount of gaming chips. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a machine-readable code, such as a QR code).

It should be appreciated that in different embodiments, in addition to or alternatively from utilizing a mobile device running a mobile device application to access funds associated with different gaming establishment accounts, and/or engage in a transaction associated with an amount of gaming chips, the system utilizes a kiosk, an EGM, a remote host controlled service window displayed by an EGM, a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk. It should be further appreciated that while illustrated in FIG. 1 as using a mobile device running a mobile device application to access funds associated with different gaming establishment accounts (e.g., a cashless wagering account), and/or engage in a transaction associated with an amount of gaming chips, a physical instrument, such as a smart card or a user issued magnetic striped card may additionally or alternatively be utilized to enable a user access to such gaming establishment accounts, and/or engage in a transaction associated with an amount of gaming chips.

Transferring Funds To a Gaming Table Component

In various embodiments, the system of the present disclosure enables a player at a gaming table to make one or more inputs, such as via a mobile device executing a mobile device application and/or a gaming table fund transfer input device, to initiate a transfer of funds from a gaming establishment account to a gaming table component associated with the gaming table. In these embodiments, once an amount of funds is transferred to the gaming table component, the system utilizes the gaming table component and the mobile device application to enable the player to verify they are the player whom should receive an amount of gaming chips corresponding to the amount of transferred funds, such as by matching verification identifiers displayed by the mobile device application and a display device of the gaming table component. In such embodiments, following the verification of the identity of the player as the player whom initiated the transfer of funds from a gaming establishment account to the gaming table component associated with the gaming table, gaming establishment personnel issue the player at the gaming table an amount of gaming chips (corresponding to the amount of transferred funds) for wagering on one or more plays of one or more games at the gaming table.

In one embodiment, the gaming table is an intelligent gaming table which enables one or more players to play one or more suitable games by placing one or more wagers utilizing gaming chips. In this embodiment, the gaming table component is part of (or otherwise associated with) the intelligent gaming table and includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component, such as to display a verification identifier associated with the transfer of funds to the gaming table component). In certain embodiments, the gaming table component additionally includes a communication interface (such as a wireless communication interface to communicate with a mobile device regarding the electronic transfer of funds to and from the gaming table component, such as to communicate data associated with a verification identifier associated with the transfer of funds to the gaming table component) and/or a printer (to generate a receipt regarding the electronic transfer of funds to and from the gaming table component, such as a gaming chip purchase receipt including a verification identifier associated with the transfer of funds to the gaming table component).

In another embodiment, the gaming table is a non-intelligent gaming table including a suitable support structure, such as one or more legs, a playing surface and a dealer position. In this embodiment, the gaming table component is separate from but associated with the gaming table and includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component, such as to display a verification identifier associated with the transfer of funds to the gaming table component). In certain embodiments, the gaming table component additionally includes or is otherwise associated with a communication interface (such as a wireless communication interface to communicate with a mobile device regarding the electronic transfer of funds to and from the gaming table component, such as to communicate data associated with a verification identifier associated with the transfer of funds to the gaming table component), a player identification device associated with the gaming table (such as a card reader to enable the player to log into the gaming table) and/or a printer (to generate a receipt regarding the electronic transfer of funds to and from the gaming table component, such as a gaming chip purchase receipt including a verification identifier associated with the transfer of funds to the gaming table component).

In another embodiment, regardless of if an intelligent gaming table or a non-intelligent gaming table are utilized, the gaming table component is a mobile gaming table component associated with one or more of such gaming tables. In this embodiment, the mobile gaming table component is associated with gaming establishment personnel. For example, a tablet or mobile device associated with a gaming establishment mobile staff member qualifies as a mobile gaming table component. In these embodiments, the mobile gaming table component includes zero, one or more input devices (to receive inputs to facilitate the electronic transfer of funds to and from the gaming table component), and zero, one or more display devices (to display information to the player and/or gaming establishment personnel regarding the electronic transfer of funds to and from the gaming table component, such as to display a verification identifier associated with the transfer of funds to the gaming table component). The mobile gaming table component additionally includes or is otherwise associated with a communication interface (such as a wireless communication interface to communicate with a mobile device regarding the electronic transfer of funds to and from the gaming table component, such as to communicate data associated with a verification identifier associated with the transfer of funds to the gaming table component), a player identification device associated with the gaming table (such as a card reader to enable the player to log into the gaming table) and/or a printer (to generate a receipt regarding the electronic transfer of funds to and from the gaming table component, such as a gaming chip purchase receipt including a verification identifier associated with the transfer of funds to the gaming table component).

In various embodiments, upon a player identification event, the system identifies a player. In certain embodiments, the system identifies a player at a gaming table (or in an area associated with a gaming table) by enabling the player to log into an account, such as a player tracking account or the gaming establishment account maintained for the player utilizing a mobile device application. In certain such embodiments, following the launching of the mobile device application, such as following the player selecting an image associated with the account stored via a digital wallet application or following the mobile device application retrieving data associated with a player account stored via a digital wallet application, the mobile device application prompts the player to cause the mobile device to engage a gaming table component, such as prompting the player to tap the mobile device to a card reader or other designated location(s) of the gaming table component. After such engagement (or after the launching of the mobile device application if no mobile device to gaming table component engagement is required), the mobile device application communicates, via a wireless communication protocol, player account data stored by the mobile device to the gaming table component. The gaming table component proceeds with operating with one or more gaming establishment systems, such as a player tracking system, to log the player into the player account at that gaming table. Thereafter, any game play activity is associated with this identified player and the player account (just as if the player would have inserted a physical player tracking card into a player tracking card reader of the gaming table component).

In certain other embodiments, the system identifies a player at a gaming table (or in an area associated with a gaming table) by enabling the player to log into the gaming table via inserting or swiping their magnetic striped playing identification card at a card reader associated with the gaming table. In certain embodiments, the system identifies a player by enabling the player to log into a mobile gaming table component, such as a mobile workstation associated with a gaming establishment mobile staff member, via inserting or swiping their magnetic striped playing identification card at a mobile card reader associated with the mobile gaming table component. In certain other embodiments, the system identifies a player at a gaming table (or in an area associated with a gaming table) by enabling the player to log into the gaming table via entering a card number of their playing identification card at an input device, such as a keypad, associated with the gaming table. In certain embodiments, the system identifies a player by enabling the player to log into a mobile gaming table component, such as a mobile workstation associated with a gaming establishment mobile staff member, associated with a gaming establishment mobile staff member via entering a card number of their player identification card at an input device, such as a keypad, of the mobile gaming table component.

In addition to identifying a player at the gaming table, upon an occurrence of a gaming table fund transfer event, the system initiates a transfer of an amount of funds from the gaming establishment account associated with the identified player to a gaming table component.

In certain embodiments, the system enables the identified player to initiate a transfer of an amount of funds from the gaming establishment account associated with the identified player, such as the player's cashless wagering account, to the gaming table component via enabling the player to facilitate the transfer of an amount of funds from the gaming establishment account to the gaming table component utilizing a mobile device application. In certain such embodiments, following the launching of the mobile device application or following the mobile device application retrieving data associated with a gaming establishment account, such as a cashless wagering account, stored via a digital wallet application, the mobile device application determines an amount of funds to be transferred from the gaming establishment account to the gaming table component.

In certain other embodiments, the system enables the identified player to initiate a transfer of an amount of funds from the gaming establishment account associated with the identified player, such as the player's cashless wagering account, to the gaming table component by enabling the player to access the associated gaming establishment account via inserting or swiping their magnetic striped playing account card at a card reader associated with the gaming table. In certain other embodiments, the system enables the identified player to initiate a transfer of an amount of funds from the gaming establishment account associated with the identified player, such as the player's cashless wagering account, to the gaming table component by enabling the player to access the associated gaming establishment account via entering a card number of their playing identification card at an input device, such as a keypad, associated with the gaming table. In these embodiments, using either a universal input device accessible by each of the players at the gaming table or an individual input device associated with an individual position or seat at the gaming table, the system enables the player to make one or more inputs regarding the requested transfer, such as but not limited to inputs to indicate an amount of funds to be transferred, a personal identification number ("PIN"), and/or a confirmation to initiate the transfer of funds. In these embodiments, following receipt of the player inputted data associated with the determined amount of funds to be transferred from the gaming establishment account to the gaming table component, the gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In certain embodiments, the system enables the identified player to initiate a transfer of an amount of funds from the gaming establishment account associated with the identified player, such as the player's cashless wagering account, to the gaming table component by enabling the player to access the associated gaming establishment account via inserting or swiping their magnetic striped playing account card at a mobile card reader of a mobile gaming table component, such as a mobile workstation associated with a gaming establishment mobile staff member. In certain other embodiments, the system enables the identified player to initiate a transfer of an amount of funds from the gaming establishment account associated with the identified player, such as the player's cashless wagering account, to the gaming table component by enabling the player to access the associated gaming establishment account via entering a card number of their player identification card at an input device, such as a keypad, of a mobile gaming table component, such as a mobile workstation associated with a gaming establishment mobile staff member.

In certain embodiments, the system enables gaming establishment personnel associated with the gaming table, such as the dealer at the gaming table, to initiate a transfer of an amount of funds from the gaming establishment account associated with the identified player, such as the player's cashless wagering account, to the gaming table component. In one such embodiment, following the gaming establishment personnel making one or more inputs to initiate a transfer of an amount of funds from the gaming establishment account associated with the identified player to the gaming table component, the system enables the identified player to confirm the gaming establishment personnel initiated transaction via inserting or swiping their magnetic striped playing account card at a card reader associated with the gaming table. In another such embodiment, following the gaming establishment personnel making one or more inputs to initiate a transfer of an amount of funds from the gaming establishment account associated with the identified player to the gaming table component, the system enables the identified player to confirm the gaming establishment personnel initiated transaction via entering a PIN and/or entering a card number of their playing identification card at an input device, such as a keypad, associated with the gaming table.

In various embodiments, using a mobile device application, a universal input device accessible by each of the players at the gaming table, and/or an individual input device associated with an individual position or seat at the gaming table, the system enables the player to make one or more inputs to confirm and/or authorize an amount of funds to be transferred. In other embodiments, following the gaming establishment personnel making one or more inputs to initiate a transfer of an amount of funds from the gaming establishment account associated with the identified player to the gaming table component, the system enables the identified player to confirm the gaming establishment personnel initiated transaction via the player making one or more confirmation inputs utilizing a mobile device application, a universal input device accessible by each of the players at the gaming table, and/or an individual input device associated with an individual position or seat at the gaming table.

Following receipt of the player inputted data associated with the confirmation of the gaming establishment personnel initiated transfer from the gaming establishment account to the gaming table component, the gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In one embodiment, the mobile device application (and/or the universal input device accessible by each of the players at the gaming table and/or an individual input device associated with an individual position or seat at the gaming table) enables the player to input an amount of funds to be transferred from the gaming establishment account to the gaming table component. In another embodiment, the mobile device application (and/or the universal input device accessible by each of the players at the gaming table and/or an individual input device associated with an individual position or seat at the gaming table) enables the player to specify an amount of gaming chips. In this embodiment, the mobile device application (or the gaming table component) converts the requested amount of gaming chips to an amount of funds to be transferred from the gaming establishment account to the gaming table component. For example, an identified player requests three red chips and five blue chips and the system transacts with the cashless wagering system which maintains the player's cashless wagering account to request a transfer of an amount of funds that corresponds to three red chips and five blue chips.

In one embodiment, the mobile device application (and/or the universal input device accessible by each of the players at the gaming table and/or an individual input device associated with an individual position or seat at the gaming table) enables the player to select an amount of funds to be transferred from a listing of available amounts of funds to be transferred from the gaming establishment account to the gaming table component. In different embodiments, the listing of available amounts to be transferred is previously selected by the player, selected by a gaming establishment or selected by a third-party. In certain embodiments, the mobile device application enables the player, a gaming establishment and/or a third-party to modify the listing of available amount of funds. In another embodiment, the mobile device application determines the listing of available amount of funds based on one or more characteristics associated with the player, such as the player's prior amounts transferred, the player's wagering history, and/or the player's status. In another embodiment, the mobile device application determines the listing of available amount of funds based on one or more characteristics associated with the gaming table associated with the gaming table component, such as based on the denomination, game type, minimum bet and/or maximum available wager amount of the gaming table associated with the gaming table component. In one embodiment, the mobile device application includes more than one listing of available amounts of funds to be transferred. In this embodiment, the mobile device application includes one listing of available amounts for an initial transfer of funds to the gaming table component for a gaming session and another listing of available amounts for a subsequent transfer of funds to the gaming table component for an existing gaming session.

In another embodiment, the mobile device application (and/or the universal input device accessible by each of the players at the gaming table and/or an individual input device associated with an individual position or seat at the gaming table) determines a default amount of funds to be transferred from the gaming establishment account to the gaming table component. In one such embodiment, the default amount of funds includes the last amount of funds transferred from the gaming establishment account to the gaming table component. The mobile device application displays to the player such a default amount of funds to be transferred. In different embodiments, the default amount to be transferred is previously selected by the player, selected by a gaming establishment or selected by a third-party. In certain embodiments, the mobile device application enables the player, a gaming establishment and/or a third-party to modify the default amount of funds displayed by the mobile device application. In another embodiment, the mobile device application determines the default amount of funds based on one or more characteristics associated with the player, such as the player's prior amounts transferred, the player's wagering history, the player's account balance, or the player's status. In one embodiment, the mobile device application (and/or the universal input device accessible by each of the players at the gaming table and/or an individual input device associated with an individual position or seat at the gaming table) includes more than one default amount of funds to be transferred. In this embodiment, the mobile device application includes one default amount for an initial transfer of funds to the gaming table component for a gaming session and another default amount for a subsequent transfer of funds to the gaming table component for an existing gaming session.

In certain embodiments, following the determination of an amount of funds to be transferred from the gaming establishment account to the gaming table component, the mobile device application prompts the player to cause the mobile device to engage the gaming table component, such as prompting the player to tap the mobile device to a player tracking card reader or other designated location(s) of the gaming table component. After such engagement (or after the determination of an amount of funds to be transferred if no mobile device to gaming table component engagement is required), the mobile device application communicates, via a wireless communication protocol, data associated with the determined amount of funds to be transferred from the gaming establishment account to the gaming table component. The gaming table component proceeds with operating with one or more gaming establishment systems, such as a gaming establishment cashless wagering system, to log the player into the gaming establishment account associated with the player (if necessary) and request the determined amount of funds to be transferred from the gaming establishment account to the gaming table component.

In another embodiment, rather than prompting the player to engage the gaming table component with the mobile device and the subsequent engagement of the gaming table component with the mobile device, the mobile device application automatically determines to transfer a default amount of funds, such as the last transferred amount of funds, from the gaming establishment account to the gaming table component. In this embodiment, the mobile device application communicates, via a wireless communication protocol, data associated with the determined amount of funds to be transferred from the gaming establishment account to the gaming table component. The gaming table component proceeds with operating with one or more gaming establishment systems to log the player into the gaming establishment account associated with the player (if necessary) and request the determined amount of funds to be transferred from the gaming establishment account to the gaming table component.

In these embodiments, regardless of if the player (or gaming establishment personnel) initiated the transfer of funds from the gaming establishment account to the gaming table component using a mobile device or a physical instrument (e.g., a player issued magnetic striped card associated with a cashless wagering system), following the gaming table component requesting the determined amount of funds, the gaming establishment system, such as the cashless wagering system, determines whether to authorize the transfer of the determined amount of funds.

If the gaming establishment system determines not to authorize the determined amount of funds, the gaming establishment system communicates a denial to the gaming table component (and/or the mobile device application, if applicable). In certain embodiments, following the denial, one or more display devices associated with the gaming table component (and/or the mobile device application) display a denial of funds transfer to the player.

On the other hand, if the gaming establishment system determines to authorize the determined amount of funds, the gaming establishment system updates the gaming establishment account associated with the player and communicates an authorization of the transferred amount of funds to the gaming table component. In certain embodiments, the gaming establishment system reduces a balance of the gaming establishment account by the determined amount of funds. In certain embodiments, the gaming establishment system places the determined amount of funds in escrow wherein the balance of the gaming establishment account is not reduced until such funds are disbursed to the player via the gaming table component confirming the transaction to release the funds from component attributable to the player to account for the determined amount of funds.

Following the completion of the transfer of an amount of funds from the gaming establishment account associated with the player to a gaming table component, the system proceeds with verifying that the player whom initiated the transfer of funds is the same player who should receive an amount of gaming chips corresponding to the amount of transferred funds. In certain embodiments, to verify that the player whom initiated the transfer of funds is the same player who should receive an amount of gaming chips corresponding to the amount of transferred funds the system determines a verification identifier to provide to both gaming establishment personnel and the player whom should receive the amount of gaming chips. The system of these embodiments employs such a verification identifier to enable gaming establishment personnel the opportunity to relatively quickly and accurately verify that the player they will provide an amount of gaming chips to is the same player that transferred an amount funds to the gaming establishment component to obtain such gaming chips. Such a determined identifier saves gaming establishment personnel time (by not requiring the gaming establishment personnel associated with the gaming table component to closely inspect at least a form of identification presented by the player) and reduces potential errors that may occur if multiple players simultaneously transferred funds to the gaming table component and the gaming establishment personnel inadvertently provides the wrong player the wrong amount of funds In certain embodiments, the determined verification identifier includes an alphanumeric code, such as a four to six string of alphanumeric characters. In certain of such embodiments, a portion of the alphanumeric characters of the determined verification identifier pertain to a seat position of the player whom should receive the gaming chips. In certain of such embodiments, the alphanumeric characters of the determined verification identifier is independent of any personal identifying information of the player whom should receive the gaming chips. In certain of such embodiments, a portion of the alphanumeric characters of the determined verification identifier additionally or alternatively pertains to personal identifying information of the player whom should receive the gaming chips, such as a first name and/or a last name of the player whom should receive the gaming chips. In certain of such embodiments, a portion of the alphanumeric characters of the determined verification identifier pertain to a seat position of the player whom should receive the gaming chips and a monotonically increasing number.

In certain embodiments, the determined verification identifier includes a random number, such as a four to six digit random number. In certain embodiments, the determined verification identifier includes a random number combined with an alphanumeric code. In certain of such embodiments, the determined verification identifier includes a random number combined with a series of alphanumeric characters that pertain to at least a seat position of the player whom should receive the gaming chips.

In certain embodiments, the determined verification identifier includes a monotonically increasing number. In certain embodiments, the determined verification identifier additionally or alternatively includes a pattern of one or more colors. In certain such embodiments, the determined verification identifier additionally or alternatively includes a pattern of one or more shapes. It should be appreciated that the determined verification identifier may be any combination of these different embodiments, such as an alphanumeric code in a specific color for a specific seat position.

Figure 2B:
FIGS. 2A, 2B, and 2C are example graphical user interfaces displayed in connection with transferring funds between a gaming establishment account and a gaming table.
Figure 2A:
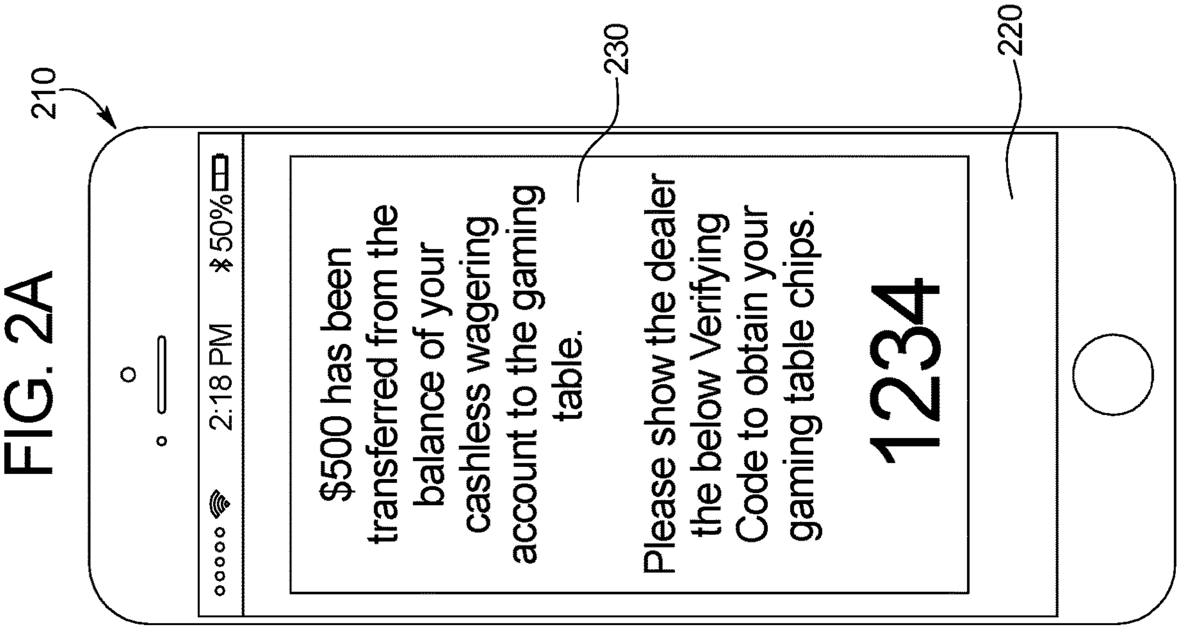

Following the determination of a verification identifier and the system storing the determined verification identifier in association with the fund transfer transaction (e.g., communicating the determined verification identifier to the gaming establishment chip management system), the gaming table component communicates data associated with the determined verification identifier to the mobile device of the player who transferred the amount of funds to the gaming table component. Such a communication results in the mobile device application being executed by the mobile device displaying the determined verification identifier. In these embodiments, to enable the person whom transferred the funds to the gaming table component to identify themselves without having to present a picture identification to the gaming establishment personnel, the system provides the determined verification identifier to that person to present to gaming establishment personnel. For example, as seen in FIG. 2A, following a transfer of $500 from a player's cashless wagering account to a gaming table, a mobile device application 210 of a mobile device 220 displays a message 230 to the player that they have successfully transferred $500 from their cashless wagering account to the gaming table and further displays a determined identifier in the form of a verifying code of 1234.

In addition to communicating data to a mobile device of a player whom transferred an amount of funds to the gaming table component, such as to a mobile device employed to facilitate the transfer of funds to the gaming table component, the gaming table component notifies gaming establishment personnel of the determined verification identifier and instructions to issue an amount of gaming chips (corresponding to the amount of transferred funds) to the player whom presents the determined verification identifier associated with the fund transfer transaction.

In one such embodiment, the gaming table component causes a receipt associated with the transfer of funds to the gaming table component to be generated wherein the receipt includes the determined verification identifier. For example, as seen in FIG. 2B, following the completion of the transfer of the $500 from the player's cashless wagering account to the gaming table component, the gaming table component utilizes a printer to print a physical gaming chip purchase receipt 240 informing the dealer to distribute $500 in gaming chips to the player at seat position 4 whom presents the determined verification identifier in the form of a verifying code of 1234. In another embodiment, the receipt including the determined verification identifier is a virtual receipt displayed to the gaming establishment personnel utilizing one or more display devices. In these embodiments, regardless of the form of the receipt, in addition to the determined verification identifier, the receipt includes other identifying information such as the player's name, a player tracking number, a player's gaming establishment account number (e.g., a player's cashless wagering account number), a player's address and/or other personally identifiable information that enables the gaming establishment personnel to validate the player's identity prior to dispensing any gaming chips to the player.

Figure 2C:
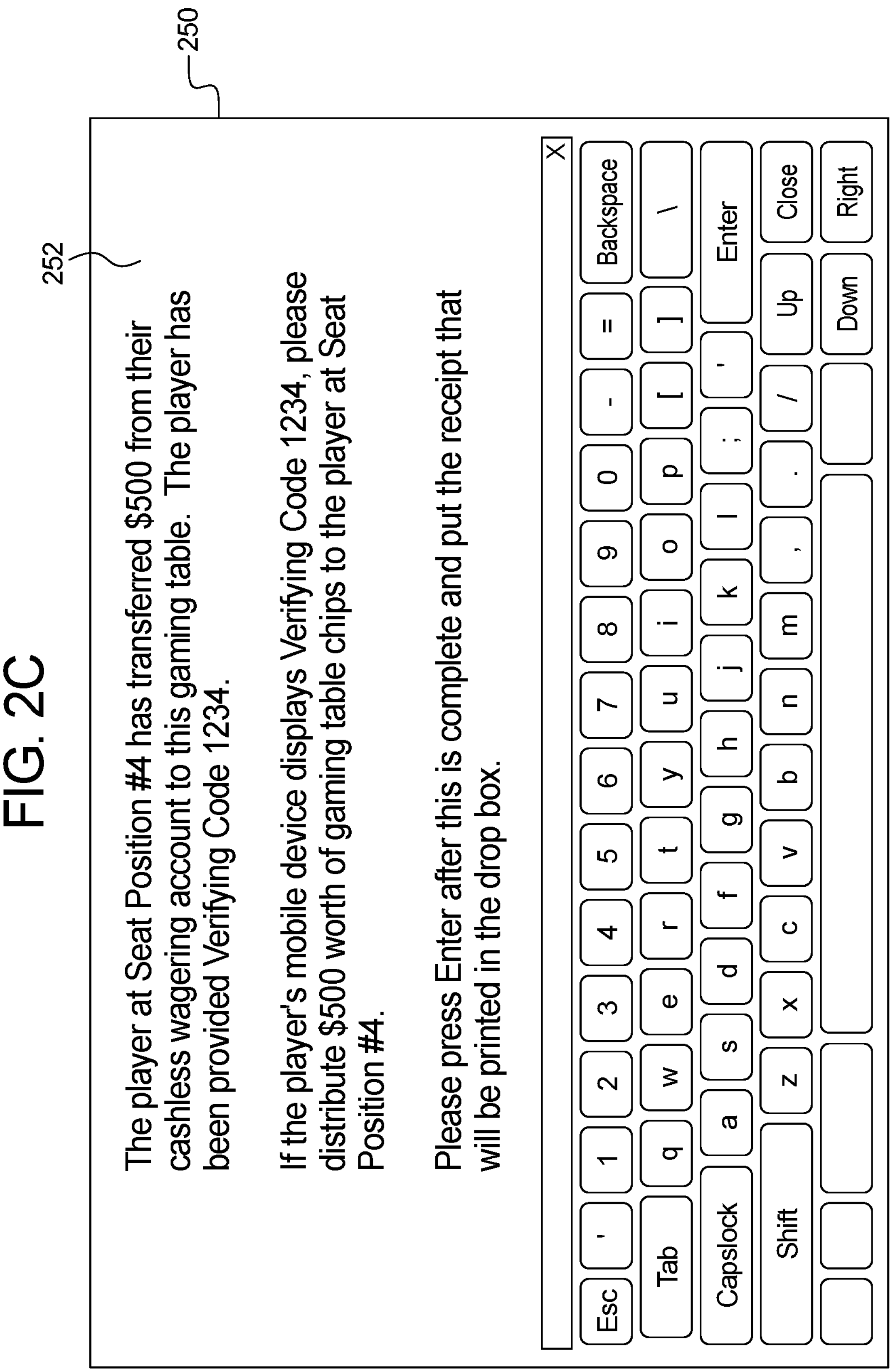
Figure 3:
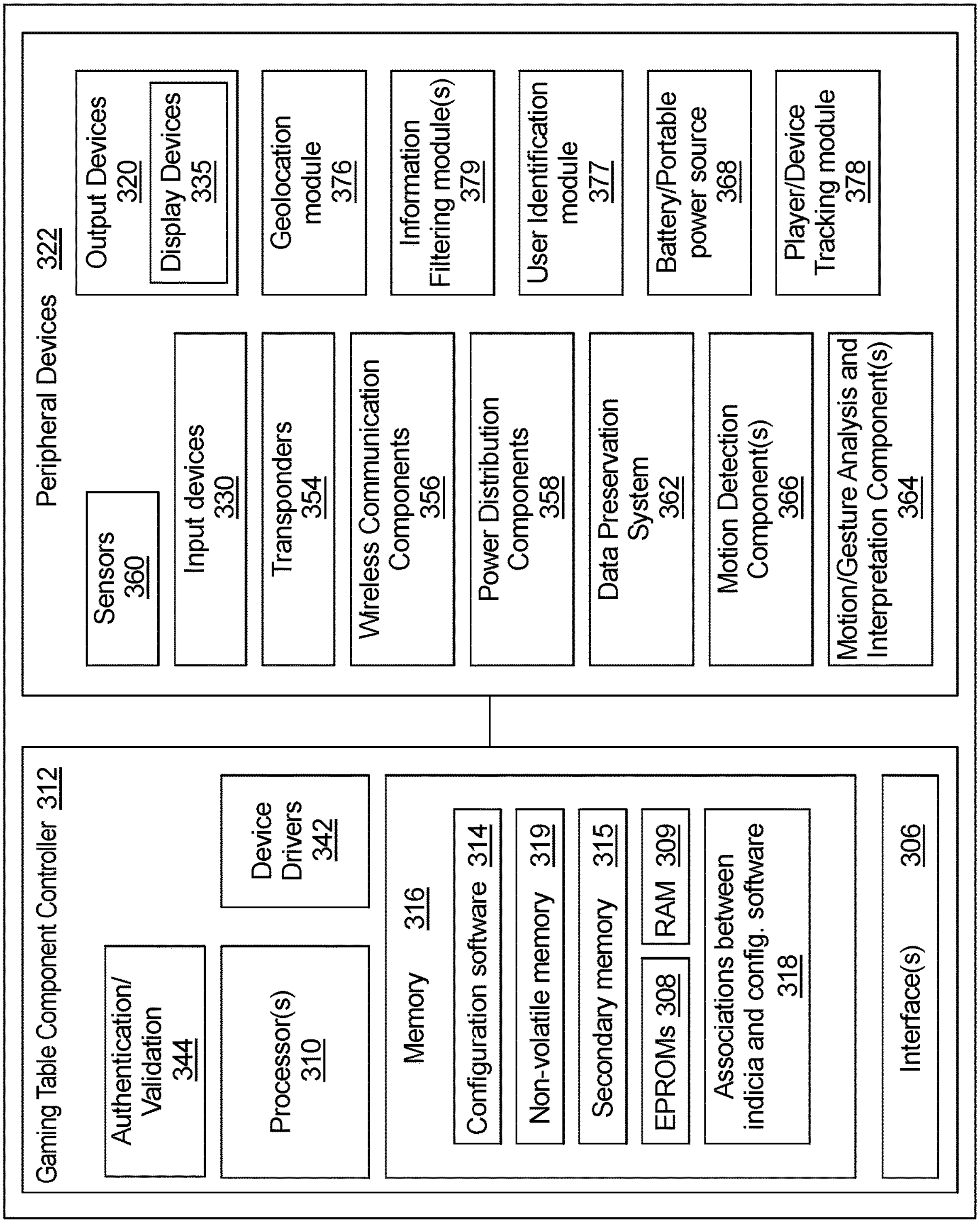
FIG. 3 is a schematic block diagram of one embodiment of a gaming table component of an example system of the present disclosure.

In another such embodiment, the gaming table component causes a display device of a dealer workstation to display the determined verification identifier and instructions to a dealer to issue the player an amount of gaming chips corresponding to the amount of transferred funds. For example, as seen in FIG. 2C, following the completion of the transfer of the $500 from the player's cashless wagering account to the gaming table component, the gaming table component utilizes a dealer workstation 250 to inform the dealer to distribute $500 in gaming chips to the player whom presents a mobile device displaying determined identifier in the form of a verifying code of 1234 252.

In another such embodiment, the gaming table component causes a display device of a mobile gaming table component, such as a mobile workstation associated with a gaming establishment mobile staff member, to display the determined verification identifier and instructions to a gaming establishment staff member associated with the gaming table to issue the player whom presents the same determined identifier an amount of gaming chips corresponding to the amount of transferred funds. For example, following the completion of the transfer of the $500 from the player's cashless wagering account to the gaming table component, the gaming table component utilizes a mobile workstation to inform the appropriate gaming establishment personnel to distribute $500 in gaming chips to the player whom presents the same pattern of colored shapes as the pattern of colored shapes being displayed by the mobile workstation.

In another such embodiment, the gaming table component communicates data to a mobile device of a player whom transferred an amount of funds to the gaming table component wherein the communicated data enables the mobile device to display a QR code including various information related to the transaction. In different embodiments, the information encoded in the QR codes includes one or more of: a verifying code, a transaction ID, a table number, a seat number, a player ID and/or player tracking card ID, a player name, a time of day, an amount of the transfer, chip count and/or amount of chips. In these embodiments, the player presents their mobile device (which displays the QR code) to a QR code scanner (handheld or otherwise) controlled by a gaming establishment staff member, such as the dealer at the table or the gaming establishment mobile staff member. The gaming establishment staff member scans the QR code displayed on the player's mobile device to complete the identity confirmation step. In these embodiments, rather than relying upon a visual validation performed by the gaming establishment staff member (and the potential for human error or fraudulent behavior), a computing device controlled by the gaming establishment staff member verifies the correct player and creates an indicator to inform the staff member that the scanned data is correct (e.g., such as by making a confirming beep and/or displaying a green check-box on a display device accessible by the staff member).

In certain embodiments, in addition to employing the determined verification identifier provided to both a player and gaming establishment personnel to enable gaming establishment personnel to relatively quickly and relatively easily confirm that the player whom transferred an amount of funds to a gaming table component is the same player whom is presenting the determined verification identifier, since the player has already identified themselves to the gaming table component and since the fund transfer requests also includes data identifying the player, the information displayed to the gaming establishment personnel includes additional identifying information regarding the player to issue the gaming chips to. In one such embodiment, the additional identifying information includes the player's name (which may be part of the determined verification identifier or a separately provided information). In another such embodiment, the additional identifying information additionally or alternatively includes the seat at the gaming table where the player is located. In another such embodiment, the additional identifying information additionally or alternatively includes a picture of the player or a picture (or icon) previously selected by the player.

Following the display of the determined verification identifier and the instructions to gaming establishment personnel to issue the player whom presents the same determined identifier an amount of gaming chips corresponding to the amount of transferred funds and following the gaming establishment personnel making one or more inputs indicating a completion of the issuance of the amount of gaming chips corresponding to the amount of transferred funds, the gaming table component causes a receipt to be generated associated with the issuance of the amount of gaming chips. In different embodiments, the receipt is the same receipt (in physical or virtual form) or a different receipt (in physical or virtual form) as the receipt generated which included the determined verification identifier and which aided the gaming establishment personnel in identifying the player whom presented a matching determined identifier.

It should be appreciated that in these embodiments, since the issuance of chips from an electronic transfer of funds to the gaming table must be accounted for when reconciling the transactions associated with the gaming table, the gaming table component causes the generation of a receipt to memorialize the electronic transaction. For example, if a dealer at a gaming table provides the player a quantity of gaming chips corresponding to the amount of funds electronically transferred from the player's gaming establishment account to the gaming table component, following using the verification identifier of a printed gaming chip purchase receipt to identify the player whom transfers an amount of funds to the gaming table component, the dealer deposits the printed gaming chip purchase receipt into a dropbox at the gaming table such that at the end of the dealer's shift, the gaming chip tray is balanced when accounting for the cash which the dealer exchanged for gaming chips and the electronic fund transfers which the dealer exchanged for gaming chips. In another example, if a gaming establishment mobile staff member servicing an area with multiple gaming tables provides a player a quantity of gaming chips corresponding to the amount of funds electronically transferred from the player's gaming establishment account to the mobile gaming table component carried by the mobile staff member, following using the verification identifier of a printed gaming chip purchase receipt to identify the player whom transfers an amount of funds to the mobile gaming table component, the mobile staff member deposits the printed receipt into a pouch or folder they carry with them such that at the end of the mobile staff member's shift, the gaming chips initially provided to the mobile staff member is balanced when accounting for the cash which the mobile staff member exchanged for gaming chips and the electronic fund transfers which the mobile staff member exchanged for gaming chips.

In another embodiment, in addition to (or alterative from) enabling a player to transfer an amount of funds from a gaming establishment account to a gaming table component (for a subsequent issuance of gaming chips corresponding to the amount of the transfer), the system enables a player to redeem gaming chips which results in a transfer of an amount of funds corresponding to the redeemed gaming chips to a gaming establishment account. In these embodiments, the system utilizes a determined identifier (which is shared with both the player redeeming an amount of gaming chips and gaming establishment personnel) and a component associated with a gaming table to redeem an amount of gaming chips and then cause an amount of funds corresponding to the amount of redeemed gaming chips to be transferred to one or more gaming establishment accounts. As such and rather than a player having to bring an amount of gaming chips from a gaming table to a gaming establishment service station, such as a casino cage, to exchange the gaming chips for cash, the system enables a player to provide an amount of gaming chips to a gaming establishment personnel associated with a gaming table component, such as a dealer at a dealer workstation at the gaming table or a gaming establishment staff member associated with a mobile workstation. In these embodiments, following a confirmation by gaming establishment personnel that a player presenting a determined identifier is the same player whom made one or more inputs using a mobile device associated with an attempted redemption of an amount of gaming chips and further following the redemption of an amount of gaming chips, the gaming establishment personnel utilizes the gaming table component, such as the dealer workstation, to facilitate a transfer of an amount of funds (corresponding to the redeemed amount of gaming chips) to a gaming establishment account maintained for that player.

More specifically, upon a gaming chip redemption event, such as the player providing a quantity of gaming chips to gaming establishment personnel, a fund amount associated with the redeemed gaming chips as well as other information associated with the redeemed gaming chips, such as details about the gaming chips that were redeemed (e.g., five $10 gaming chips and four $100 gaming chips) are determined and inputted into or otherwise communicated to the gaming table component.

In one embodiment, the gaming establishment personnel determines the fund amount associated with the redeemed gaming chips and inputs, via an input device, the fund amount and other associated information associated with the redeemed gaming chips. For example, a dealer counts the gaming chips redeemed by a player as well as determines details about the types and numbers of gaming chips that were redeemed and inputs such information into a dealer workstation. In another example, a gaming establishment mobile staff member counts the gaming chips redeemed by a player as well as determines details about the types and numbers of gaming chips that were redeemed and inputs such information into a mobile gaming table component, such as a tablet carried by the mobile staff member.

In another embodiment, the gaming table includes or is otherwise associated with a gaming chip acceptor which receives the redeemed gaming chips, determines, such as based on weight and/or size of each redeemed gaming chip, the fund amount associated with the redeemed gaming chips as well as details about the types and numbers of gaming chips that were redeemed, and automatically inputs or otherwise communicates such information to the gaming table component. In another example, a gaming establishment mobile staff member utilizes a gaming chip acceptor which receives the redeemed gaming chips, determines, such as based on weight and/or size of each redeemed gaming chip, the fund amount associated with the redeemed gaming chips as well as details about the types and numbers of gaming chips that were redeemed, and automatically inputs or otherwise communicates such information to a mobile gaming table component, such as a tablet carried by the mobile staff member.

In another embodiment wherein the gaming chips employ radio frequency identification ("RFID"), one or more antennas identify the gaming chips such that the system automatically determines the fund amount associated with the redeemed gaming chips. In one such embodiment, one or more RFID antennas are part of or otherwise associated with the gaming table such that the system reads the gaming chips redeemed, calculates the fund amount associated with the redeemed gaming chips, determines the details about the types and numbers of gaming chips that were redeemed and automatically inputs or otherwise communicates such information to the gaming table component. In another such embodiment, one or more RFID antennas are part of or otherwise associated with a pouch or folder carried by a gaming establishment mobile staff member such that the system reads the gaming chips redeemed, calculates the fund amount associated with the redeemed gaming chips, determines the details about the types and numbers of gaming chips that were redeemed and automatically inputs or otherwise communicates such information to the mobile gaming table component.

In these embodiments, following one or more inputs representative of an attempted redemption of the amount of gaming chips, a verification by gaming establishment personnel that the player redeeming the gaming chips has presented the same determined identifier as provided to the gaming establishment personnel and the determination of the fund amount associated with the redeemed gaming chips as well as the details about the types and numbers of gaming chips that were redeemed, the system enables the player to confirm the gaming chip redemption. Following receipt of the player inputted data associated with the confirmation of the gaming chip redemption, the gaming table component proceeds with operating with one or more gaming establishment systems, such as a gaming establishment cashless wagering system, to log the player into the gaming establishment account associated with the player (if necessary) and transfer the determined amount of funds from the gaming table component to the gaming establishment account maintained for that player.

In these embodiments, the gaming establishment system updates the gaming establishment account associated with the player and communicates an authorization of the transferred amount of funds to the gaming table component. In these embodiments, the gaming establishment system increases a balance of the gaming establishment account by the determined amount of funds. The gaming table component proceeds with updating a balance of the gaming table component associated with the player to account for the transferred amount of funds. In certain embodiments, the gaming table component further proceeds with communicating a transfer of funds confirmation, wherein one or more display devices associated with the gaming table component (and/or the mobile device application, if applicable) display a confirmation of the transfer of the amount of funds for the redeemed gaming chips.

Following the display of information indicating a completion of the transfer of an amount of funds associated with the redeemed gaming chips to a gaming establishment account associated with a player, the gaming table component causes a receipt to be generated associated with the redemption of the amount of gaming chips. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers. In these embodiments, since the redemption of gaming chips at a gaming table which results in an electronic transfer of funds to a gaming establishment account must be accounted for when reconciling the transactions associated with the gaming table, the gaming table component causes the generation of a receipt to memorialize the electronic transaction. For example, if a dealer at a gaming table redeems a quantity of gaming chips corresponding to the amount of funds electronically transferred to the player's gaming establishment account, the dealer deposits the printed receipt into a dropbox at the gaming table such that at the end of the dealer's shift, the gaming chip tray is balanced when accounting for the cash which the dealer exchanged for gaming chips and the electronic fund transfers which the dealer exchanged and/or redeemed for gaming chips. In another example, if a gaming establishment mobile staff member servicing an area with multiple gaming tables redeems a quantity of gaming chips corresponding to the amount of funds electronically transferred to the player's gaming establishment account, the mobile staff member deposits the printed receipt into a pouch or folder they carry with them such that at the end of the mobile staff member's shift, the gaming chips in the possession of the mobile staff member is balanced when accounting for the cash which the mobile staff member exchanged for gaming chips and the electronic fund transfers which the mobile staff member exchanged and/or redeemed for gaming chips.

Funds Transferred to Gaming Establishment Fund Management Account

In various embodiments, prior to transferring an amount of funds to and from a gaming establishment account to a gaming table component an amount of funds must first be established or otherwise deposited in the gaming establishment account.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the player establishes a gaming establishment fund management account by a deposit of funds (such as at a kiosk) to be subsequently utilized in association with the mobile device application. In other embodiments, the gaming establishment fund management account is funded via a mobile device electronic fund transfer, such using Apple Pay™ or Android Pay™. It should be appreciated that in different embodiments, the system utilizes a mobile device running a mobile device application, a kiosk, an electronic gaming machine, a gaming table component, a remote host controller service window displayed and/or a gaming establishment interface to facilitate the transfer of funds from a third-party account.

In certain embodiments, the system enables a player to fund the gaming establishment fund management account independent of the mobile device and independent of the mobile device application. In certain such embodiments, the system enables funds to be deposited in a gaming establishment fund management account via a gaming table component (or an EGM). In certain embodiments, the system enables an identified player that has an amount of cash to utilize an EGM (or an kiosk) to convert the cash to an amount deposited into a gaming establishment fund management account (which may be subsequently transferred to the gaming table component utilizing a mobile device application). In other embodiments, the system enables funds to be deposited in a gaming establishment fund management account via an EGM (or an kiosk) that accepts printed ticket vouchers. In these embodiments, the system enables a player that has one or more printed ticket vouchers to utilize an EGM (or an kiosk) to convert the printed ticket voucher to an amount deposited into a gaming establishment fund management account (which may be subsequently transferred to the gaming table component utilizing a mobile device application).

In certain embodiments, the system enables funds to be deposited in a gaming establishment fund management account via a gaming establishment interface, such as a casino desk. In certain embodiments, the system enables a player that has an amount of cash to utilize a gaming establishment interface, such as a casino desk to convert the cash to an amount deposited into a gaming establishment fund management account (which may be subsequently transferred to a gaming table component utilizing a mobile device application). In other embodiments, the system enables funds to be deposited in a gaming establishment fund management account via a gaming establishment interface that accepts printed ticket vouchers. In these embodiments, the system enables a player that has one or more printed ticket vouchers to utilize a gaming establishment interface to convert the printed ticket voucher to an amount deposited into a gaming establishment fund management account (which may be subsequently transferred to a gaming table component utilizing a mobile device application).

In certain embodiments, the system enables funds to be deposited in a gaming establishment fund management account via a kiosk that accepts money. In certain embodiments, the system enables a player that has an amount of cash to utilize a kiosk to convert the cash to an amount deposited into a gaming establishment fund management account (which may be subsequently transferred to a gaming table component utilizing a mobile device application). In other embodiments, the system enables funds to be deposited in a gaming establishment fund management account via a kiosk that accepts printed ticket vouchers. In certain embodiments, the system enables a player that has one or more printed ticket vouchers to utilize a kiosk to convert the printed ticket voucher to an amount deposited into a gaming establishment fund management account (which may be subsequently transferred to a gaming table component utilizing a mobile device application).

In certain embodiments, the gaming establishment fund management account is associated with funds associated with one or more virtual ticket vouchers. In certain embodiments, the system enables a player associated with an amount of virtual ticket vouchers to utilize an gaming table component, a gaming table component, a mobile device running a mobile device application, a kiosk and/or a gaming establishment interface to convert the virtual ticket vouchers to an amount deposited into a gaming establishment fund management account.

In various embodiments wherein a mobile device application is employed to facilitate a transfer of funds to gaming table, prior to enabling a user to take any action related to the system, as indicated above, a pairing or linkage occurs between the mobile device and the gaming table component occurs via one or more wireless communication protocols. In such embodiments, the gaming table component of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, 5G, LTE), one or more Wi-Fi compatible standards, and one or more short range communication protocols (e.g., a near field communication ("NFC") protocol). In certain embodiments, communication with the mobile device can occur through one or more wireless interfaces of the gaming table component. Such wireless interfaces are configured to receive information, such as information associated with one or more accounts and instructions to initiate a transfer of an amount of funds from a gaming establishment account to the gaming table component (to be exchanged for an amount of gaming chips corresponding to the amount of funds) utilizing a mobile device. In one embodiment, the wireless interface is integrated into the cabinet of the gaming table component and the gaming table component processor is configured to communicate directly with and send control commands to the wireless interface. In another embodiment, the wireless interface is integrated into a device mounted to and/or within the gaming table component cabinet, such as a player tracking unit or a user identification device of a player tracking unit. In certain embodiments where the wireless interface is embedded in a secondary device, such as a player tracking unit, the gaming table component processor sends control commands to control the wireless interface via a secondary controller, such as a player tracking controller.

It should be appreciated that while certain data or information pertaining to one or more of the requested actions are communicated from a gaming table component (or a component of a gaming establishment management system supported by or otherwise located inside the gaming table component) to a mobile device, such data or information may additionally or alternatively be communicated: (i) from one or more servers to a mobile device via one or more wireless communication protocols, or (ii) from a gaming table component to one or more servers via one or more wireless communication protocols and then from one or more servers to a mobile device via one or more wireless communication protocols.

It should be further appreciated that any functionality or process of the present disclosure may be implemented via one or more servers, one or more gaming table components, one or more gaming establishment components (such as a component of a gaming establishment management system (e.g., a player tracking unit) supported by or otherwise located inside the gaming table component), or a mobile device application. For example, while certain data or information of the present disclosure is explained as being communicated from a gaming table component or a gaming establishment component (such as a component of a gaming establishment management system (e.g., a player tracking unit) supported by or otherwise located inside the gaming table component) to a mobile device via one or more wireless communication protocols, such data or information may additionally or alternatively be communicated from one or more servers to a mobile device via one or more wireless communication protocols. Accordingly: (i) while certain functions, features or processes are described as being performed by a gaming table component, such functions, features or processes may alternatively be performed by one or more servers, or one or more mobile device applications, or one or more gaming establishment components (such as a component of a gaming establishment management system (e.g., a player tracking unit) supported by or otherwise located inside the gaming table component), (ii) while certain functions, features or processes are described as being performed by one or more mobile device applications, such functions, features or processes may alternatively be performed by one or more servers, or one or more gaming table components, or one or more gaming establishment components (such as a component of a gaming establishment management system (e.g., a player tracking unit) supported by or otherwise located inside the gaming table component), (iii) while certain functions, features or processes are described as being performed by one or more servers, such functions, features or processes may alternatively be performed by one or more gaming table components, or one or more mobile device applications, or one or more gaming establishment components (such as a component of a gaming establishment management system (e.g., a player tracking unit) supported by or otherwise located inside the gaming table component)), and (iv) while certain functions, features or processes are described as being performed by one or more gaming establishment components (such as a component of a gaming establishment management system (e.g., a player tracking unit) supported by or otherwise located inside the gaming table component), such functions, features or processes may alternatively be performed by one or more gaming table components, or one or more mobile device applications, or one or more servers. It should additionally be appreciated that any of the mobile device facilitated transactions involving an amount of funds may occur in addition to or as an alternative from cash-based transactions and/or ticket voucher-based transactions.

Gaming Table Components

The above-described embodiments of the present disclosure may be implemented in accordance with or in conjunction with one or more of a variety of different types of gaming table components, such as, but not limited to, a kiosk (or mobile gaming table component) and/or a kiosk (or mobile gaming table component) in combination with a server.

In certain embodiments, the gaming table component includes a gaming table component controller 312 configured to communicate with and to operate with a plurality of peripheral devices 322.

The gaming table component controller 312 includes at least one processor 310. The at least one processor 310 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface 306 of the gaming table component controller 312; (2) converting signals read by an interface to a format corresponding to that used by software or memory of the gaming table component; (3) accessing memory to configure or reconfigure parameters in the memory according to indicia read from the gaming table component; (4) communicating with interfaces and the peripheral devices 322 (such as input/output devices); and/or (5) controlling the peripheral devices 322. In certain embodiments, one or more components of the gaming table component controller 312 (such as the at least one processor 310) reside within a housing of the gaming table component (described below), while in other embodiments at least one component of the gaming table component controller 312 resides outside of the housing of the gaming table component.

The gaming table component controller 312 also includes at least one memory device 316, which includes: (1) volatile memory (e.g., RAM 309, which can include non-volatile RAM, magnetic RAM, ferroelectric RAM, and any other suitable forms); (2) non-volatile memory 319 (e.g., disk memory, FLASH memory, EPROMs, EEPROMs, memristor-based non-volatile solid-state memory, etc.); (3) unalterable memory (e.g., EPROMs 308); (4) read-only memory; and/or (5) a secondary memory storage device 315, such as a non-volatile memory device, configured to store gaming software related information (the software related information and the memory may be used to store various audio files not currently being used and invoked in a configuration or reconfiguration). Any other suitable magnetic, optical, and/or semiconductor memory may operate in conjunction with the gaming table component of the present disclosure. In certain embodiments, the at least one memory device 316 resides within the housing of the gaming table component (described below), while in other embodiments at least one component of the at least one memory device 316 resides outside of the housing of the gaming table component.

The at least one memory device 316 is configured to store, for example: (1) configuration software 314, such as all the parameters and settings on the gaming table component; (2) associations 318 between configuration indicia read from a gaming table component with one or more parameters and settings; (3) communication protocols configured to enable the at least one processor 310 to communicate with the peripheral devices 322; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the gaming table component to communicate with local and non-local devices using such protocols. In one implementation, the gaming table component controller 312 communicates with other devices using a serial communication protocol. A few non-limiting examples of serial communication protocols that other devices, such as peripherals (e.g., a bill validator or a ticket printer), may use to communicate with the gaming table component controller 312 include USB, RS-232, and Netplex (a proprietary protocol developed by IGT).

As will be appreciated by one skilled in the art, aspects of the present disclosure may be illustrated and described in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 316 is configured to store program code and instructions executable by the at least one processor of the gaming table component to control the gaming table component. The at least one memory device 316 of the gaming table component also stores other operating data, such as image data, event data, input data, or information, and/or applicable rules on the gaming table component. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in a gaming table component to implement at least part of the present disclosure. In other embodiments, part or all of the program code and/or the operating data is downloaded to the at least one memory device of the gaming table component through any suitable data network described above (such as an Internet or intranet).

The at least one memory device 316 also stores a plurality of device drivers 342. Examples of different types of device drivers include device drivers for gaming table component components and device drivers for the peripheral components 322. Typically, the device drivers 342 utilize various communication protocols that enable communication with a particular physical device. The device driver abstracts the hardware implementation of that device. For example, a device driver may be written for each type of card reader that could potentially be connected to the gaming table component. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the gaming table component loads the new device driver from the at least one memory device to enable communication with the new device. For instance, one type of card reader in the gaming table component can be replaced with a second different type of card reader when device drivers for both card readers are stored in the at least one memory device.

In certain embodiments, the software units stored in the at least one memory device 316 can be upgraded as needed. For instance, when the at least one memory device 316 is a hard drive, new parameters, new settings for existing parameters, new settings for new parameters, new device drivers, and new communication protocols can be uploaded to the at least one memory device 316 from the gaming table component controller 312 or from some other external device. As another example, when the at least one memory device 316 includes a CD/DVD drive including a CD/DVD configured to store options, parameters, and settings, the software stored in the at least one memory device 316 can be upgraded by replacing a first CD/DVD with a second CD/DVD. In yet another example, when the at least one memory device 316 uses flash memory 319 or EPROM 308 units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device 316 also stores authentication and/or validation components 344 configured to authenticate/validate specified gaming table component components and/or information, such as hardware components, software components, firmware components, peripheral device components, user input device components, information received from one or more user input devices, information stored in the at least one memory device 316, etc.

In certain embodiments, the peripheral devices 322 include several device interfaces, such as: (1) at least one output device 320 including at least one display device 335; (2) at least one input device 330 (which may include contact and/or non-contact interfaces); (3) at least one transponder 354; (4) at least one wireless communication component 356; (5) at least one wired/wireless power distribution component 358; (6) at least one sensor 360; (7) at least one data preservation component 362; (8) at least one motion/gesture analysis and interpretation component 364; (9) at least one motion detection component 366; (10) at least one portable power source 368; (11) at least one geolocation module 376; (12) at least one user identification module 377; (13) at least one player/device tracking module 378; and (14) at least one information filtering module 379.

The at least one output device 320 includes at least one display device 335 configured to display any displayed by the gaming table component and any suitable information. In certain embodiments, the display devices are connected to or mounted on a housing of the gaming table component (described below).

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In certain embodiments, the at least one output device 320 is a sound generating device controlled by one or more sound cards. In one such embodiment, the sound generating device includes one or more speakers or other sound generating hardware and/or software configured to generate sounds.

The at least one input device 330 may include any suitable device that enables an input signal to be produced and received by the at least one processor 310 of the gaming table component.

In various embodiments, the at least one input device 330 includes a plurality of buttons that are programmable by the gaming table component operator to, when actuated, cause the gaming table component to perform particular functions. In certain embodiments, the at least one input device 330 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the gaming table component by touching the touch screen at the appropriate locations.

In embodiments including a player tracking system, as further described below, the at least one input device 330 includes a card reader in communication with the at least one processor of the gaming table component.

The at least one wireless communication component 356 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 356 transmits electrical, electromagnetic, or optical signals that carry digital data streams or analog signals representing various types of information.

The at least one wired/wireless power distribution component 358 includes components or devices that are configured to provide power to other devices. For example, in one embodiment, the at least one power distribution component 358 includes a magnetic induction system that is configured to provide wireless power to one or more user input devices near the gaming table component. In one embodiment, a user input device docking region is provided, and includes a power distribution component that is configured to recharge a user input device without requiring metal-to-metal contact. In one embodiment, the at least one power distribution component 358 is configured to distribute power to one or more internal components of the gaming table component, such as one or more rechargeable power sources (e.g., rechargeable batteries) located at the gaming table component.

In certain embodiments, the at least one sensor 360 includes at least one of: optical sensors, pressure sensors, RF sensors, infrared sensors, image sensors, thermal sensors, and biometric sensors. The at least one sensor 360 may be used for a variety of functions, such as: detecting movements and/or gestures of various objects within a predetermined proximity to the gaming table component; detecting the presence and/or identity of various persons (e.g., players, casino employees, etc.), devices (e.g., user input devices), and/or systems within a predetermined proximity to the gaming table component.

The at least one data preservation component 362 is configured to detect or sense one or more events and/or conditions that, for example, may result in damage to the gaming table component and/or that may result in loss of information associated with the gaming table component. Additionally, the data preservation system 362 may be operable to initiate one or more appropriate action(s) in response to the detection of such events/conditions.

The at least one motion/gesture analysis and interpretation component 364 is configured to analyze and/or interpret information relating to detected player movements and/or gestures to determine appropriate player input information relating to the detected player movements and/or gestures. For example, in one embodiment, the at least one motion/gesture analysis and interpretation component 364 is configured to perform one or more of the following functions: analyze the detected gross motion or gestures of a player; interpret the player's motion or gestures to identify instructions or input from the player. In other embodiments, at least a portion of these additional functions may be implemented at a remote system or device.

The at least one portable power source 368 enables the gaming table component to operate in a mobile environment. For example, in one embodiment, the gaming table component 300 includes one or more rechargeable batteries.

The at least one geolocation module 376 is configured to acquire geolocation information from one or more remote sources and use the acquired geolocation information to determine information relating to a relative and/or absolute position of the gaming table component. For example, in one implementation, the at least one geolocation module 376 is configured to receive GPS signal information for use in determining the position or location of the gaming table component. In another implementation, the at least one geolocation module 376 is configured to receive multiple wireless signals from multiple remote devices (e.g., gaming table components, servers, wireless access points, etc.) and use the signal information to compute position/location information relating to the position or location of the gaming table component.

The at least one user identification module 377 is configured to determine the identity of the current user or current owner of the gaming table component. For example, in one embodiment, the current user is required to perform a login process at the gaming table component in order to access one or more features. Alternatively, the gaming table component is configured to automatically determine the identity of the current user based on one or more external signals, such as an RFID tag or badge worn by the current user and that provides a wireless signal to the gaming table component that is used to determine the identity of the current user. In at least one embodiment, various security features are incorporated into the gaming table component to prevent unauthorized users from accessing confidential or sensitive information.

The at least one information filtering module 379 is configured to perform filtering (e.g., based on specified criteria) of selected information to be displayed at one or more displays 335 of the gaming table component.

In various embodiments, the gaming table component includes a plurality of communication ports configured to enable the at least one processor of the gaming table component to communicate with and to operate with external peripherals, such as: accelerometers, arcade sticks, bar code readers, bill validators, biometric input devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

Gaming Tables

In certain embodiments, as indicated above, the system employs one or more intelligent gaming tables or gaming chip tracking systems. In one embodiment, each intelligent gaming table enables one or more players to play one or more suitable games by placing one or more wagers utilizing such gaming chips. Such game play and/or wagering information is tracked by the intelligent gaming table and provided to a server. In another embodiment, the server is in communication with at least one player tracking system to identify at least one player currently placing at least one wager on at least one suitable game at at least one of the intelligent gaming tables in the system.

In another embodiment, the gaming tables utilized in the system are non-intelligent gaming tables wherein the gaming chip identification devices are not directly integrated or situated in or on the gaming tables. In this embodiment, one or more gaming chip identification devices are utilized to track each player's wagered gaming chips. In one such embodiment, gaming chip identification devices are located at, above or below the table. In another such embodiment, the gaming chip identification devices are attached to the gaming table or adjacent to the gaming table. In another such embodiment, the gaming chip identification devices are included in the gaming table. In these embodiments, gaming establishments do not have to purchase new gaming tables. Rather, gaming establishments may continue using the same gaming tables and install the intelligent table technology around one or more gaming tables.

Figure 4:
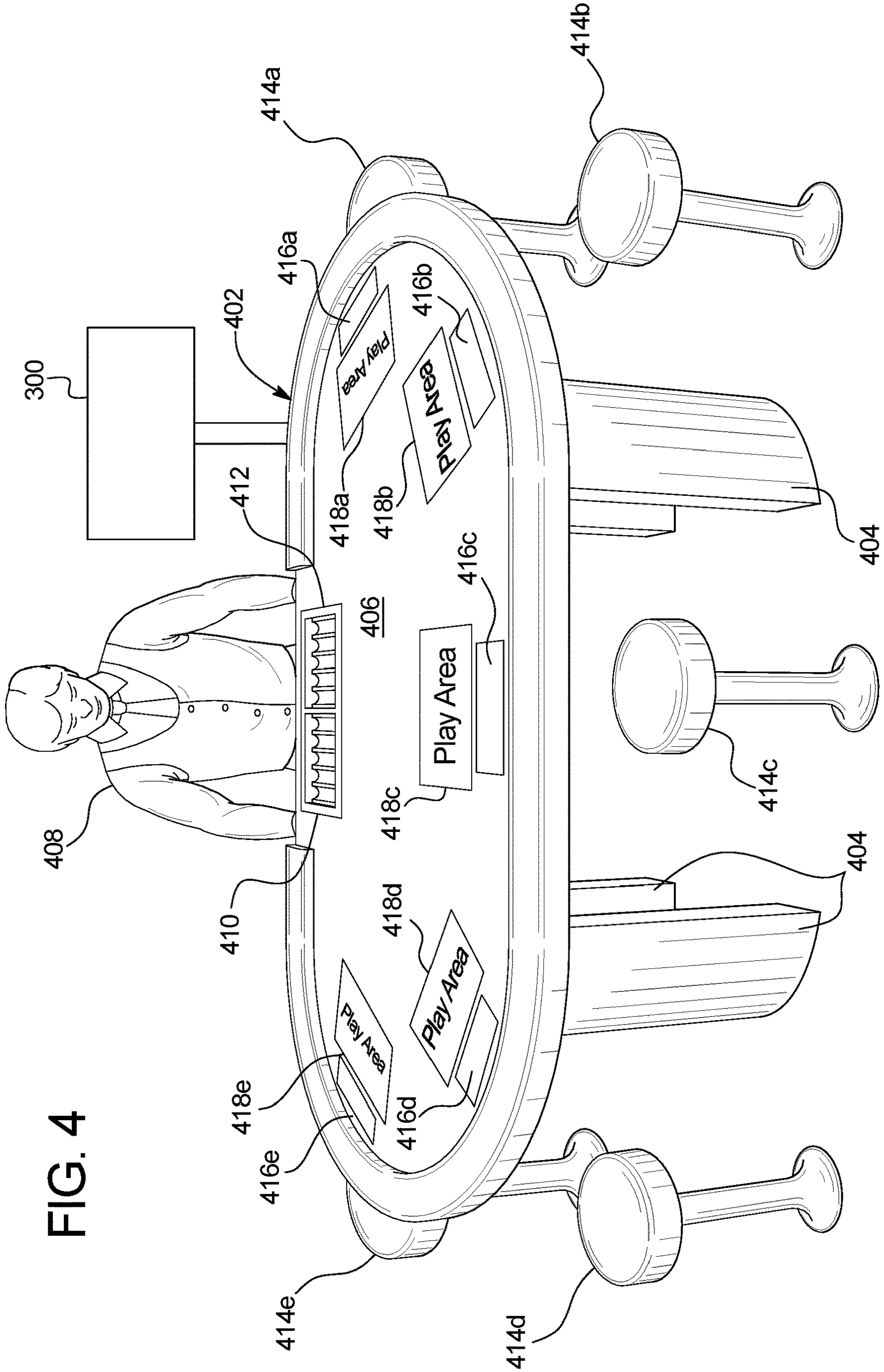
FIG. 4 is a perspective view of one embodiment of a gaming table of the present disclosure.

In one embodiment, as illustrated in FIG. 4, a gaming table 402 includes a suitable support structure 404, such as one or more legs, a playing surface 406 and a dealer position 408. In one embodiment, the dealer position includes two different gaming chip trays 410 and 412 for holding several stacks of the dealer's gaming chips. The dealer may use the gaming chip trays to collect and store gaming chips, make change for a player, and/or distribute gaming chips upon a gaming chip distribution event associated with the gaming table component 300. The gaming table includes a plurality of player stations or seats 414*a*, 414*b*, 414*c*, 414*d* and 414*e*. In this example, there are five player stations or seats. It should be appreciated that the gaming table may accommodate any suitable number of player positions and players so as not to interfere with game play. In one embodiment, the gaming table includes a plurality of gaming chip holding areas 416*a*, 416*b*, 416*c*, 416*d* and 416*e* where the players hold their gaming chips. In certain embodiment, the gaming tables include wagering areas (not illustrated) where players place their bets. It should be appreciated that the gaming table may also include a community wagering area (not illustrated) where each of the players place their wagers. In one embodiment, the gaming table also includes a plurality of playing areas 418*a*, 418*b*, 418*c*, 418*d* and 418*e* associated with each of the player stations.

In one embodiment, cards are dealt by the dealer substantially within the respective playing areas, such that cards dealt to a first player position are not confused with cards dealt to a second different player position. It should be appreciated that games played at the gaming tables may include any suitable card game or any suitable non-card game, such as roulette and craps. The gaming tables are operable to include any suitable apparatuses or components of the games. It should be appreciated that different gaming tables in the system may include the same game components or different game components.

In one embodiment, one or more gaming tables in the system each include at least one processor and at least one memory device, including, but not limited to the processors and memory devices of the gaming table component described above. In one embodiment, the system of gaming tables is integrated with one or more player tracking systems. In this embodiment, the system and/or player tracking system is operable to track any participating player's gaming activity at each gaming table of the system. In one such embodiment, the system and/or the associated player tracking system timely tracks when a player inserts their playing tracking card to begin a gaming session and also timely tracks when a player removes their player tracking card, stops playing at the gaming table or cashes out when concluding play for that gaming session. In another embodiment, the dealer or host logs the player in and out. In one such embodiment, at the start of a gaming session, the player hands the player's tracking card to the dealer and the dealer or host logs the player in and out for a gaming session. In different embodiments, the system works in accordance with the player tracking system to maintain data about players.

In other embodiments, rather than requiring a player to insert a player tracking card or enter identifying information, the gaming table utilizes one or more portable devices carried by a player, such as a cell phone, email communication device, a radio frequency identification tag or any other suitable wireless device to track when a player begins and ends a gaming session. In other embodiments, the gaming table utilizes any suitable biometric technology or ticket technology to track when a player begins and ends a gaming session. Each of the gaming tables may include any suitable number of player tracking input devices, such as card readers or key pads to enter identification numbers. In one embodiment, each player station or seat includes an individual player tracking input device. In another embodiment, a gaming table includes a single player tracking input device. In another embodiment, only a dealer has access to the player tracking input device and inputs all of each player's information.

It should be appreciated that the intelligent table system of the present disclosure may include any suitable components or devices to monitor the players' gaming activity. That is, the intelligent table systems tracks how much a player wagers or how many gaming chips a player wagers, how much a player has won or lost, how many gaming chips the player has on the gaming table, or any other desired tracking information. In one embodiment, the intelligent table system also tracks this information for each and every game played by the player. It should be appreciated that the intelligent table system may include any suitable gaming table areas with gaming chip identification devices, any suitable method of identifying the gaming chips, and may use any suitable gaming chip reading technology.

In one embodiment, the intelligent gaming tables or gaming chip tracking systems tracks, monitors and records game play occurring at one or more gaming table player stations, regardless of which player is currently playing at each gaming station. In another embodiment, the intelligent gaming tables or gaming chip tracking systems tracks, monitors and records game play of one or more players at such gaming tables. In this embodiment, the player tracking system identifies players and records or saves the game play information provided by the intelligent tables in specific player accounts.

In another embodiment, the intelligent gaming table of the present disclosure employs a virtual gaming table. The virtual gaming table provide virtual playing cards and/or virtual gaming chips which enable one or more players to play one or more games at the intelligent gaming table. In one embodiment, such virtual gaming tables can utilize one or more surface computing mechanisms, one or more cameras and one or more of a plurality of display devices to provide these games. In one such embodiment, an intelligent gaming table includes an acrylic top and employs a plurality of infrared cameras and a DLP projector with wireless networks to display and detect objects and movement. In this embodiment, as players move their hands or objects on the table top, the cameras translate the motions into commands.

It should be appreciated that values may be assigned to gaming chips in any suitable manner. In one embodiment, different denominations of gaming chips are visually different, such as having the value displayed on the gaming chip, having different sizes and/or having different weights. In another such embodiment, each gaming chip is associated with one of a plurality of different values. In this embodiment, the intelligent table system identifies the individual gaming chips (such as using RFID technology), determines the placement of each gaming chip and sends the information to the player tracking system or server about each of the specific gaming chips. In one embodiment, the server associates the value of the gaming chip with the player tracking account.

In one embodiment, each of the gaming chips has or is associated with an identification number. The intelligent table system determines the gaming chip identification number upon play or win of a gaming chip or upon the evaluation of all of the gaming chips in a player's gaming chip identification area. The intelligent table system sends the gaming chip information to the server. The system associates the gaming chip number with the amount and the player. In one embodiment, the intelligent table system determines which gaming chips are in which identification area and sends the information to the server. The system associates the gaming chip numbers with their value and uses the information to determine one or more aspects of game play.

The intelligent table system of the present disclosure is operable to use a variety of types of technology to track player activity. More specifically, in one embodiment, the intelligent table system is operable to include one or more gaming chip identifying devices. In one embodiment, the intelligent table system uses Infra-red signals received from table game gaming chips to track activity. In another embodiment, as indicated above, the intelligent table system employs RFID to track gaming chip activity. The RFID is a system that uses a small electronic device that includes a small gaming chip and an antenna. The gaming chips are scanned at the gaming table to retrieve the identifying information. In another embodiment, the system uses optical technology. The system may use any suitable other gaming chip identification devices, which may use any suitable gaming chip identification technology, to determine player gaming table wagering activities. The gaming chips are tracked for total gaming chip movement or wins and losses. When each gaming chip is placed in a gaming chip identification area, such as a betting circle or in a player's betting or wagering area, gaming chip identification devices recognizes the gaming chip and relays this data to the intelligent table system.

The system of the present disclosure contemplates a plurality of different methods that the gaming chips may be used and/or identified during game play. In one embodiment, a gaming chip identification area is a gaming chip holding area. In one embodiment, intelligent table system identifies all of the gaming chips in a player's gaming chip holding area. For example, during game play, a player is required to have all gaming chips in that player's possession in a gaming chip holding area which each include one or more gaming chip identification devices. Upon a game play checkpoint, such as at a designated time interval, upon a triggering event, at the end of a play of a game or at the end of a gaming session, the intelligent table system surveys each of the player's gaming chip holding areas to identify the players' gaming chips.

In one embodiment, the gaming chip identification area is a wagering area. In one embodiment, the system includes gaming chip identification devices in each player's wagering area. The system identifies either the specific gaming chips wagered and won or loss by that player or the number of gaming chips wagered and won or loss by the player. For example, a player logs into the player tracking system via a card slot at the player's player station at a gaming table. When a player places a gaming chip in the wagering area associated with that player station, the intelligent table system identifies that gaming chip. When a dealer or host provides a gaming chip to a player for a win, the intelligent table system identifies the gaming chip.

In another embodiment, both the gaming chip holding area and the wagering area include gaming chip identification devices. That is, the system is operable to identify gaming chips in both the gaming chip holding area and the wagering area. Therefore, the system double checks or verifies each player's gaming activity.

In one embodiment, the system associates the gaming activity directly with players via player accounts. For example, at the start of play, the player logs into the player tracking system, such as by inserting a player tracking card into a card reader associated with their player station on the gaming table. In this embodiment, the intelligent table system associates any tracked data with the player's specific account. Thus, in certain embodiments, tracking player activity at the gaming table is similar in accuracy and thoroughness to the tracking done at slot machines.

Alternatively, the system determines the gaming chip count at each player station. That is, the system enables players to play anonymously and be associated with their current place at the table. For example, a player does not have to log in for one or more plays of a game but rather remains at a same player station for such plays of the game. The system associates the gaming chips with the player stations.

In certain embodiments, the intelligent table system includes one or more card readers or a card reading system. The card reading system knows what card comes out of the shoe and is dealt to what player. In one embodiment, the card reading system is a part of the intelligent table system. In another embodiment, the card reading system is separate from the intelligent table system and in association with the intelligent table system detects betting patterns and decisions to provide to the player tracking system. Such betting patterns and decisions may qualify the player to win one or more bonus awards. The card reading system can also reduce dealer error and or possible corruption by making sure that the players are paid properly for each and every hand. In certain embodiments, the intelligent table system knows the player cards, the dealer cards, and the bet, the intelligent table system is enabled to determine correct payouts for each and every player at the gaming table. In certain embodiments, the system employs safeguards to make sure the correct payout is made. For example, the system can send a halt play signal if an error is detected. It should be appreciated that in different embodiments the card reading system and the intelligent table system are integrated with or included in one or more tracking systems or player tracking systems.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A device comprising:

a processor; and a memory device that stores a plurality of instructions that, when executed by the processor in association with a transfer of an amount of funds from an account associated with a user, cause the processor to:

communicate data that results in a display, by a first display device associated with the user, of an identifier determined in association with a verification of the transfer of the amount of funds, and communicate data that results in a display, by a second, different display device, of the identifier determined in association with the verification of the transfer of the amount of funds.

2. The device of claim 1, wherein the account associated with the user comprises a gaming establishment account associated with the user.

3. The device of claim 1, wherein the identifier comprises at least one of a plurality of alphanumeric characters, a plurality of digits of a random number, a plurality of digits of a monotonically increasing number, and a plurality of shapes.

4. The device of claim 1, wherein the identifier is independent of any personal identifying information associated with the user.

5. The device of claim 1, wherein the identifier displayed by the first display device and the identifier displayed by the second, different display device are a same color.

6. The device of claim 1, wherein the second, different display device comprises one of a display device of a dealer workstation associated with a gaming table, and a display device of a mobile workstation.

7. The device of claim 1, wherein the identifier displayed by the second, different display device is part of a gaming chip purchase receipt.

8. A device comprising:

a processor, and a memory device that stores a plurality of instructions that, when executed by the processor in association with a transfer of an amount of funds from a gaming establishment account associated with a user, cause the processor to:

communicate data that results in a display, by a display device associated with the user, of an identifier determined in association with a verification of the transfer of the amount of funds, and communicate data that results in a printer printing a receipt associated with the amount of funds and comprising the identifier determined in association with the verification of the transfer of the amount of funds.

9. The device of claim 8, wherein the identifier comprises at least one of a plurality of alphanumeric characters, a plurality of digits of a random number, a plurality of digits of a monotonically increasing number, and a plurality of shapes.

10. The device of claim 8, wherein the identifier is independent of any personal identifying information associated with the user.

11. The device of claim 8, wherein the identifier displayed by the display device and the identifier of the receipt are a same color.

12. The device of claim 8, wherein the memory device stores a plurality of further instructions that, when executed by the processor responsive to the transfer of the amount of funds from the account, cause the processor to communicate data that results in a display, by a second, different display device, of the identifier.

13. A method of operating a device, the method comprising:

displaying, by a first display device associated with a user, an identifier determined in association with a verification of a transfer of an amount of funds from an account associated with the user, and displaying, by a second, different display device, the identifier determined in association with the verification of the transfer of the amount of funds.

14. The method of claim 13, wherein the account associated with the user comprises a gaming establishment account associated with the user.

15. The method of claim 13, wherein the identifier comprises at least one of a plurality of alphanumeric characters, a plurality of digits of a random number, a plurality of digits of a monotonically increasing number, and a plurality of shapes.

16. The method of claim 13, wherein the identifier is independent of any personal identifying information associated with the user.

17. The method of claim 13, wherein the identifier displayed by the first display device and the identifier displayed by the second, different display device are a same color.

18. The method of claim 13, wherein the second, different display device comprises one of a display device of a dealer workstation associated with a gaming table, and a display device of a mobile workstation.

19. The method of claim 13, wherein the identifier displayed by the second, different display device is part of a gaming chip purchase receipt.

* * * * *